# UNITED STATES PATENT OFFICE.

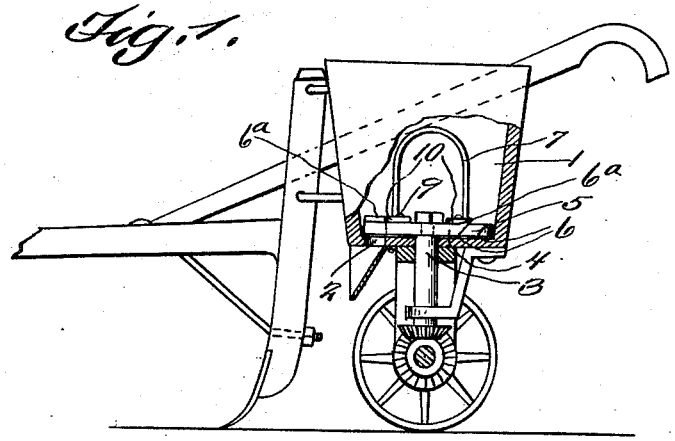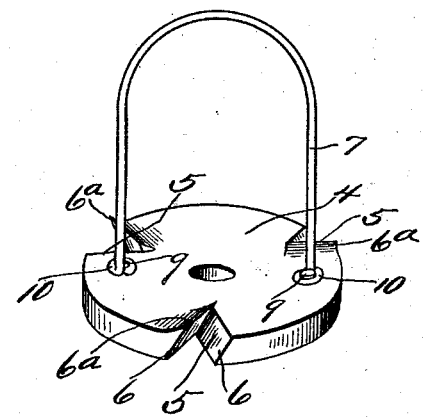

JOHN CAL MOORE, OF BERNICE, LOUISIANA.

SEEDER AND PLANTER.

1,018,580.  Specification of Letters Patent.  Patented Feb. 27, 1912.

Application filed October 23, 1911. Serial No. 656,125.

*To all whom it may concern:*

Be it known that I, JOHN C. MOORE, a citizen of the United States, residing at Bernice, in Union parish and State of Louisiana, have invented a new and useful Seeder and Planter; and I do hereby declare the following to be a full, clear, and exact description of the invention, such as will enable others skilled in the art to which it appertains to make and use the same.

This invention relates generally to the art of seeders and planters, and more particularly to a new and useful seed disk or plate attachment, adapted for use in the seed box of the planter.

The principal object of the invention is the provision of a simple, efficient and practical seed disk or plate, whereby the seed may be dropped in small lots substantially every eighteen inches apart.

The invention comprises further features and combinations of parts, as hereinafter set forth, shown in the drawings and claimed.

In the drawings:—Figure 1 is a sectional view through a portion of the seed box, showing the seed disk or plate therein. Fig. 2 is a perspective view of the seed disk or plate removed.

Referring to the drawings 1 designates the seed box, having the usual outlet 2 for the seed. Arranged in the seed box, and operated by the member 3 (which may in turn be operated by any suitable means not shown) is the seed disk or plate 4. This seed disk or plate 4 is annular in contour and is provided with a plurality of V-shaped openings 5, which are designed to register with the outlet opening of the seed box. The walls of the V-shaped opening are beveled downwardly and rearwardly as shown at 6, or in other words in the same direction so that the seed may more readily pass therethrough. One of the beveled walls of each of the openings is provided with a short lip $6^a$, so as to cause the seed to enter the opening.

Carried by the seed plate or disk is an agitator member 7, which is designed to agitate seeds or the like in the box. This agitator member is in the form of a bowed metallic member each end of which is formed with an oppositely laterally extending eye 10, which is secured to one face of the plate or disk by means of a bolt or the like 9 thus supporting the agitator in a vertical position.

From the foregoing it will be observed that, there has been devised a novel, simple and efficient edge drop feed disk or plate, and one which has been found to be practical.

The invention having been set forth, what is claimed as new and useful is:—

1. In an edge drop feeder, a feed plate adapted to rotate horizontally and having edge V-shaped openings, the openings having their walls beveled in the same direction and rearwardly and downwardly.

2. In an edge drop feeder, an annular horizontally revoluble feed disk having edge V-shaped openings, the two walls of which are beveled in the same direction, one of the walls having an extension lip.

In testimony whereof I have signed my name to this specification in the presence of two subscribing witnesses.

JOHN CAL MOORE.

Witnesses:
Y. S. TUNER,
W. H. HARRIS.

---

Copies of this patent may be obtained for five cents each, by addressing the "Commissioner of Patents, Washington, D. C."